United States Patent [19]

Houck

[11] Patent Number: 4,933,195
[45] Date of Patent: Jun. 12, 1990

[54] METHOD FOR COOKING LARGE OR SMALL QUANTITIES OF FOOD

[76] Inventor: Philip I. Houck, 205 7th St., Ocean City, Md. 21842

[21] Appl. No.: 293,188

[22] Filed: Jan. 3, 1990

Related U.S. Application Data

[62] Division of Ser. No. 886,803, Jul. 18, 1986, Pat. No. 4,815,439.

[51] Int. Cl.$^5$ .................................................. A23L 1/01
[52] U.S. Cl. ........................................ 426/233; 426/523
[58] Field of Search ............... 426/523, 233; 219/400, 219/413; 126/39 G, 19 R, 41 R

[56] References Cited

U.S. PATENT DOCUMENTS 4,633,065 12/1986 Takazume et al. ................. 219/400

Primary Examiner—George Yeung
Attorney, Agent, or Firm—Fleit, Jacobson, Cohn, Price, Holman & Stern

[57] ABSTRACT

An electric cooking unit, a gas-fired cooking unit, and a burner assembly usable with the gas-fired unit for rapidly or slowly grilling large or small quantities of food in a controlled manner. The cooking unit includes side walls defining a heating enclosure, a plurality of food holding members supported by top surfaces of the side walls for positioning food within the heating enclosure, a grate assembly mounted within the heating enclosure for supporting a bed of refractory coals below the food holding members, and gas-fired or electric heating elements for heating the grate assembly and heating the bed of refractory coals to incandescent temperatures. When the cooking unit is gas-fired, the unit includes a plurality of burner assemblies which can be individually controlled, each assembly having a flame guard assembly releasably mounted on a tubular member having a plurality of apertures for distributing a cooking gas within the heating enclosure. The flame guard assembly has a shield positioned above the tubular member so that hot combustion products flow upwardly around side edges of the shield to heat the grate assembly and the refractory coals. The cooking unit and a method using the cooking unit are designed for selectively rapidly heating or slowly heating large or small quantities of food product, such as pieces of beef and ham having pre-cooked weights greater than five pounds.

3 Claims, 2 Drawing Sheets

METHOD FOR COOKING LARGE OR SMALL QUANTITIES OF FOOD

This is a divisional of application Ser. No. 886,803 filed July 18, 1986, now U.S. Pat. No. 4,815,439.

BACKGROUND OF THE INVENTION

1. Field of the Invention

The present invention relates to the cooking of large or small quantities of relatively large pieces of meat, such as top round, hams and other types of meat having a pre-cooked weight of approximately ten pounds. More particularly, the invention provides a control system for a cooking unit, and a method using the cooking unit, for slowly cooking large quantities of food product.

2. Description of the Prior Art

A cooking unit for rapidly cooking large quantities of meat, on the order of 400 to 500 pounds at a time, is disclosed in my U.S. Pat. No. 4,402,300, issued Sept. 6, 1983. While that cooking unit works extremely well for its intended purpose, the rapid cooking of the meat tends to cause up to 30 percent shrinkage of the meat during a cooking operation. Preparing the meat and mounting it in the cooking unit for a cooking operation also can be a time-consuming procedure. Further, since the food cannot be prepared and mounted in the cooking unit the night before, because of health, fire and sanitation requirements, the preparation and mounting of the food in the cooking unit must be accomplished in the morning of the day that the food is to be cooked and served. Accordingly, to reduce shrinkage during cooking and enable the meat to be prepared the night before, a need exists for a cooking system in which the food can be prepared and mounted in the cooking unit the night before, and then slow-cooked during the night unattended, with final cooking, if necessary, being accomplished the following morning. A primary purpose of this invention is to provide such a system, and more particularly, such a system in which the food is slow-cooked, held at a preset internal serving temperature if cooking is completed before serving is to begin, and then serving the food at the desired time.

SUMMARY OF THE INVENTION

In general, a control system for cooking food comprises a first temperature probe insertable into food being cooked in a cooking unit for determining the internal temperature of the food during the cooking operation, and a second temperature probe for determining the temperature adjacent a heat source of the cooking unit. First and second electrical thermostat control devices are responsive to the first and second temperature probes, respectively, for energizing and de-energizing the cooking unit heat source. Each of the thermostat control devices is movable from a closed condition to an open position when the respective temperature exceeds a predetermined value, and the thermostat control devices are connected in series so that the heat source is energized only when both of the devices are closed and is de-energized when either of the devices is opened.

The control system may be used with a gas-fired cooking unit, wherein the control system further comprises a gas valve electrically connected in series with the first and second thermostat control devices, for controlling gas to a gas burner of the cooking unit, with the gas valve being operative when both of the thermostat control devices are closed and inoperative when either of the thermostat control devices is opened. In order to produce cooked food which is well done over an 8–12 hour period, the first thermostat control device is responsive to the first temperature probe when the internal temperature of the food reaches a temperature in a range on the order of 170°–180° F. and the second thermostat control device is responsive to the second temperature probe when the temperature in the area of the heat source is in a range on the order of 225°–250° F. The invention further relates to a method of cooking food utilizing the control system and/or a cooking unit which incorporates the control system therein.

More specifically, the present invention provides an improved cooking unit for slowly grilling large or small quantities of food, and a method using either a gas-fired or electric cooking unit for slowly grilling large or small quantities of food product.

The cooking unit provided by the present invention is intended for a permanent or semi-permanent installation that can be used on a repetitive basis. The unit is especially designed for using gas to cook large pieces of meat, such as top round having a pre-cooked weight of approximately ten pounds and hams of approximately the same size, slowly overnight, and for maintaining cooked meat at a preset internal temperature until serving time.

One embodiment of the present invention provides a gas-fired cooking unit for grilling food over a heat source. The unit has side walls that cooperate with each other to define a cooking or heating enclosure. A plurality of food holding members extend across the heating enclosure and have end portions resting on flat top surfaces of the side walls. The lengths of the food holding members are preferably greater than the distance between outer edges of the side walls so that the ends of the members can be grasped to reposition the food being cooked. Preferably, a plurality of individual pieces of meat are skewered on each pair of food holding members. The members, which may be stainless steel rods, are rotatable with respect to each other to position a different surface of the meat closest to the heat source. A grate assembly is mounted within the heating enclosure and may be used for supporting a bed of refractory coals below the meat. A burner, which can be either gas fired or electric, is supported below the grate assembly. The burner comprises a plurality of spaced-apart elongate burner assemblies that extend between the side walls and are controllable to produce a slow rate of cooking of the pieces of meat.

When the unit is gas-fired, a burner assembly is provided that includes tubular member having a plurality of apertures formed therein for distributing a cooking gas. A flame guard assembly is releasably mounted on the tubular member to prevent grease from falling into and blocking the apertures in the tubular member. The flame guard assembly includes an elongate shield with a width sufficient to cover the apertures in the tubular member, support means for spacing the shield vertically above the tubular member, and means for releasably mounting the support means on the tubular member.

Preferably, the shield has a relatively flat elongate central portion so that grease from cooking food falling on the central portion is diverted in an upwards direction to be burned by the hot combustion products or is burned as the grease flows towards side edges of the shield. The grease does not drip in any significant quantity from the shield, but stays on the shield for a sufficiently long period of time to be burned. There is no requirement to provide a separate grease trap for accumulation of the grease. Also, since there is no grease trap, the problem of flare-up when accumulated grease ignites is virtually eliminated.

Preferably, the shield is releasably mounted on the tubular member for ease of installation and to facilitate its removal for cleaning and appropriate maintenance. For instance, a pair of straps have first ends rigidly connected to the support for the shield and second ends that are connected to each other underneath the tubular member.

To facilitate cleaning and maintenance of the unit, it is preferable that the grate assembly be formed of a plurality of individual assemblies. When used, the refractory material on one of the individual assemblies is moved onto another of the assemblies. The first assembly is then removed to provide access to the burner assembly underneath the removed grate section and to facilitate cleaning of the removed grate assembly. After the first grate assembly is reinstalled, the refractory material from the second assembly can be shifted onto the first assembly so that the entire assembly can be sequentially removed.

It is also preferable that the side walls defining the cooking enclosure are covered with stainless steel or steel. Also, the grate assembly is preferably formed of stainless steel or steel tubular bars. Use of round bars eliminates corners which can accumulate grease and be difficult to clean. Because of the high temperatures used within the cooking enclosure, it is preferable for the flame guard assembly to be formed from stainless steel or steel.

With the method provided by the present invention, several relatively large pieces of meat are skewered onto each pair of stainless steel rods. The ends of the rods are then supported on the top surfaces of walls defining the heating enclosure so that one surface of the skewered meat is positioned above the heat source. Heat control is provided so that when the internal temperature of the meat and the temperature adjacent the burner are both less than respective preselected values, the burner is turned on. When one of the temperatures exceeds its respective preselected value, the burner is turned off.

The invention, and its objects and advantages, will become more apparent in the detailed description of the preferred embodiments hereinafter presented.

BRIEF DESCRIPTION OF THE DRAWINGS

In the detailed description of the preferred embodiments of the invention hereinafter presented, reference is made to the accompanying drawings, in which.

DESCRIPTION OF THE PREFERRED EMBODIMENTS

Figure 1:
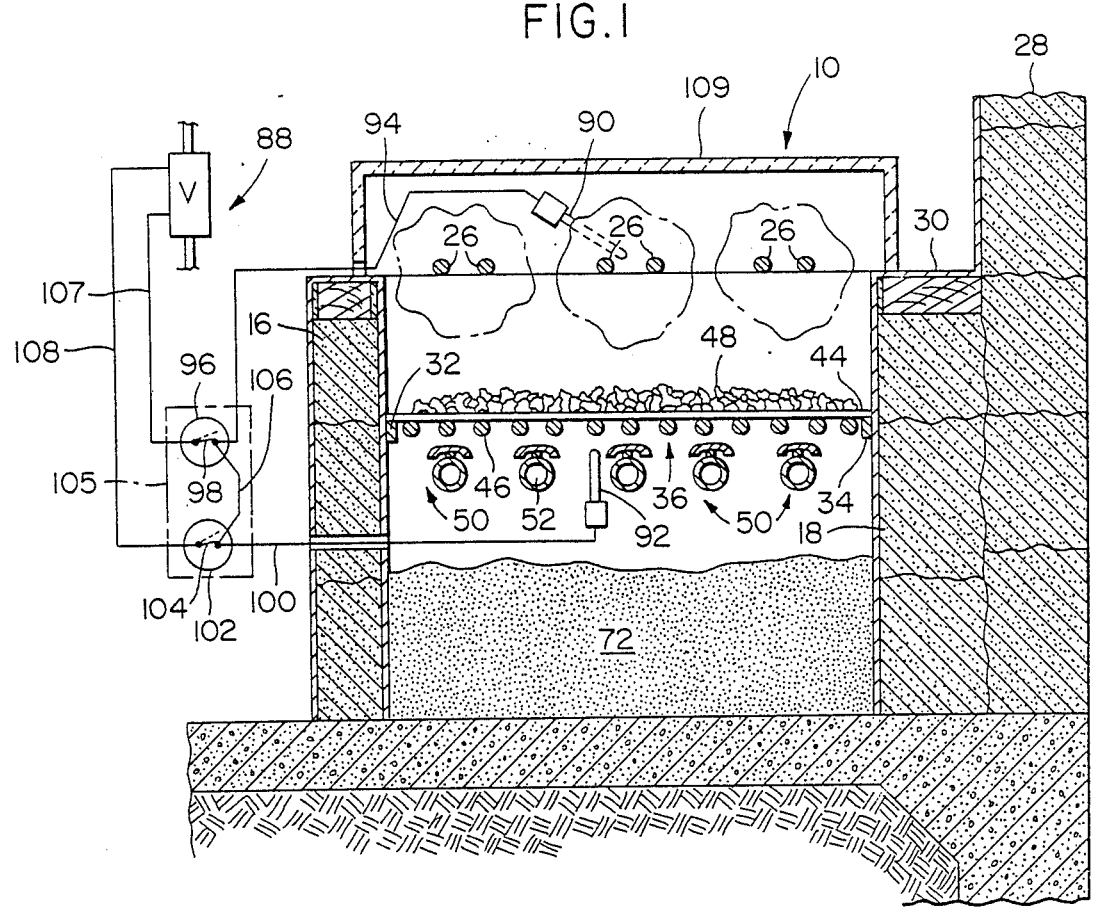
FIG. 1 is a schematic vertical section of one embodiment of a gas-fired cooking unit according to the present invention.

The present description will be directed in particular to elements forming part of, or cooperating more directly with, the present invention. Elements not specifically shown or described herein are understood to be selectable from those known in the art.

Referring now to the drawings, and to FIGS. 1 to 3 in particular, one embodiment of the present invention is illustrated and will be described as a modification of a gas-fired cooking unit, generally designated 10, which is shown and described as a rapid cooking unit in my U.S. Pat. No. 4,402,300, the disclosure of which, to the extent not inconsistent with this invention, is included herein.

The cooking unit 10 has a first pair of side walls 12, 14 that cooperate with a second pair of side walls 16, 18 to define a heating enclosure 20. The side walls 12, 14, 16 and 18 are formed of cinder, fire brick or masonry block, which may be coated with sheets of stainless steel. The side walls 12 and 14 have flat top surfaces 22, 24, respectively, that support end portions of food holding members 26. Preferably, the food holding members 26 are stainless steel or steel tubular bars or rods that have end portions extending beyond outer edges of the side walls 12, 14. For the purpose of clarity, FIGS. 2 and 4 only illustrate supported end portions of one pair of rods 26. A rear wall 28 extends upwardly above the side wall 18 to form a barrier between the cooking unit 10 and the building (not shown) containing the cooking unit. Since the rear wall 28 reflects heat, the top surface 30 of side wall 18 forms a warming shelf. Support surfaces 32, 34 are provided on the walls 16, 18, respectively. These support surfaces 32, 34 extend substantially the entire lengths of the side walls 16, 18.

A grate assembly, generally designated 36, is supported on the surfaces 32 and 34. Preferably, the assembly 36 is formed of a plurality of individual sections or assemblies 38, 40, and 42. Each of the individual sections 38, 40 and 42 is formed of a plurality of members 44 that extend between and rest on the support surfaces 32 and 34. Preferably, the members 44 are tubular stainless steel or steel bars spaced approximately one inch apart from each other. The members 44 of each of the individual sections 38, 40 and 42 are interconnected by a plurality of members 46, which preferably are tubular stainless steel or steel bars. The grate assembly 36 may support a bed of refractory material 48, which has not been illustrated in FIGS. 2 and 4 so as to facilitate the illustration of structure positioned underneath the bed. In the alternative, the bed of refractory material 48 may be omitted, with the grate assembly 36 relied upon to provide upwardly directed radiant heat for cooking and without any significant difference in function of the cooking unit 10.

As best illustrated in FIG. 1, a plurality of burner assemblies, generally designated 50, are positioned underneath the grate assembly 36 and the bed 48. Each burner assembly 50 includes an elongate tubular member 52 that extends substantially the entire distance between the side walls 12 and 14. While FIG. 2 illustrates the ends of the tubular members 52 spaced from the side wall 14, it should be readily appreciated that side wall 14 can be modified to provide appropriate support for the tubular members. The other ends 54 of the tubular members 52 protrude beyond the side wall 12 and are connectable to a manifold or source 56 of cooking gas.

A thermostat controlled, millivolt main gas valve 58 controls the supply of the cooking gas to the cooking unit 10 and to an elongated runner-type pilot tube 59 of a known type suitably connected to each of the elongate tubular members 52. Individual valves 60 are also associated with each of the tubular members 52 to selectively control the amount of energy supplied to the portion of the bed 48 located above the particular burner assembly. Preferably, the valves 60 are spaced from the side wall 12 to isolate the valves from portions of the tubular members 52 heated by combustion within the heating enclosure 20.

Figure 3:
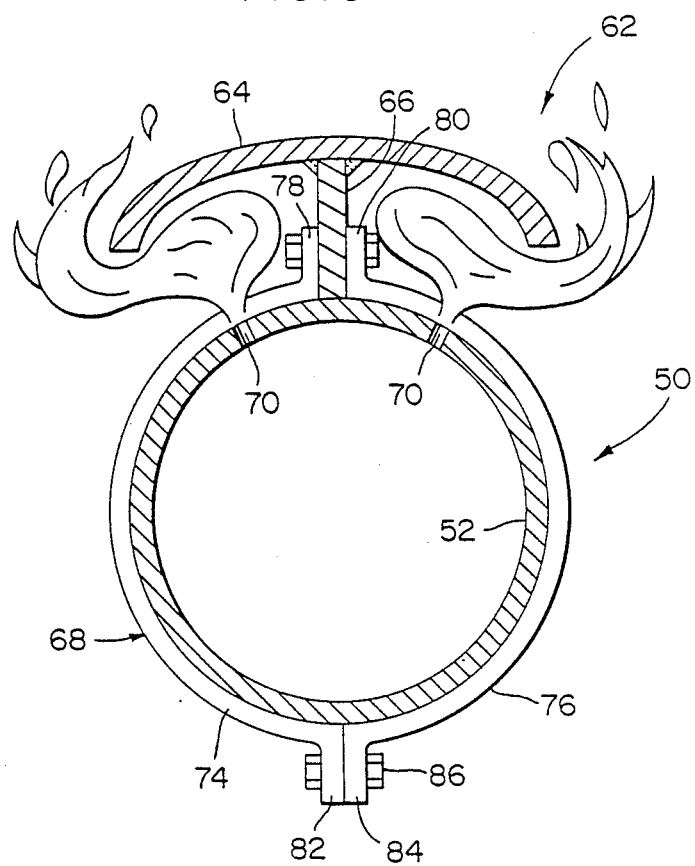
FIG. 3 is an enlarged sectional view of one embodiment of a burner assembly usable with the gas-fired cooking unit of FIG. 1.

As illustrated in FIG. 3, each of the burner assemblies 50 includes a flame guard assembly, generally designated 62. The flame guard assembly 62 includes an elongate shield member 64, a support 66 for spacing the shield vertically above the tubular member 52, and means 68 for releasably mounting the support 66 on the tubular member. The distance between side edges of the shield 64 is greater than the distance between apertures 70 formed in the tubular member 52 that introduce cooking gas into the heating enclosure 20. As a result, grease falling from food being cooked is prevented from clogging the apertures 70. Preferably, the shield 64 is relatively flat so that grease falling onto the shield is either diverted in an upward direction or remains on the shield and is burned as it flows towards the shield side edges. Relatively small amounts of the grease fall from the side edges into a bed 72 of sand or other suitable material positioned under the burner assemblies 50.

It has been found that the spacing between the shield 64 and the tubular member 52 is an important feature contributing to the efficiency of the cooking unit 10. If the spacing is too great, the cooking gas is contained within the shield 64 and does not adequately heat the bed 48 of refractory material. If the shield is too close, there is an adverse impact on combustion efficiency. When the spacing is correct, the combustion products "roll" around side edges of the shield 64, as illustrated in FIG. 3.

It is preferable to releasably mount the shield 64 on the tubular member 52. Such releasable mounting facilitates construction of the cooking unit 10 and makes it easier to thoroughly clean the unit. A suitable mount is a pair of straps 74, 76. First ends 78, 80, respectively, of the straps 74, 76 are connected to the support 66 by a bolt-and-nut connection, by welding, or by any other suitable means. Second ends 82, 84, respectively, of the straps 74, 76 are provided with aligned apertures for receiving a nut-and-bolt connection 86. Use of such connection facilitates easy attachment and removal of the burner assembly 50 from the tubular member 52.

In one embodiment of the cooking unit 10, the tubular member 52 has a nominal diameter of two inches; the height of the support 66 is between ½ inch and 1½ inches, with 1 inch being a preferred height; and the top of the shield 64 is spaced 1½ inches from the bottom of the grate assembly 36. With this embodiment, 400 to 500 pounds of meat are cooked at one time.

Figure 4:
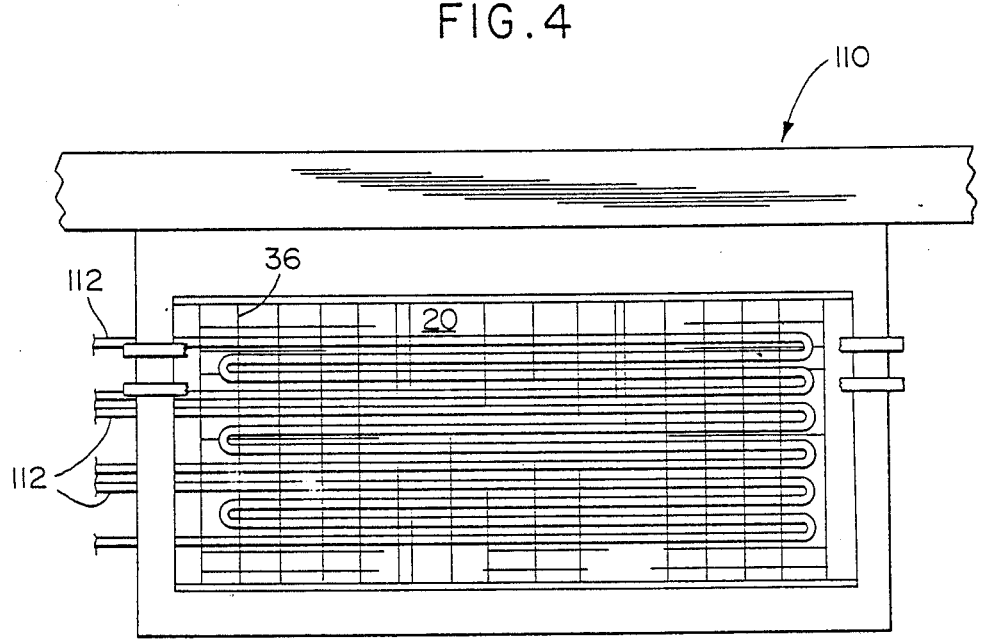
FIG. 4 is a view similar to FIG. 2 of another embodiment of the present invention.

In use, pieces of food to be cooked, such as top round having a pre-cooked weight of approximately ten pounds and hams, are skewered on a pair of the food holding rod members 26. The number of pieces skewered on each pair of rods 26 is a function of the distance between the side walls 12 and 14, the size of the individual pieces of meat, and anticipated demand for the cooked product. End portions of the rods 26, as illustrated in FIGS. 2 and 4, are positioned on the flat top surfaces 22 and 24 of the side walls 12 and 14. When the cooking unit 10 is used for cooking, valves 58 and 60 are appropriately adjusted to furnish cooking gas to one or more of the burner assemblies 50. If only a limited amount of meat is to be cooked, cooking gas is furnished only to a selected one or two of the tubular members 52. Alternatively, if some of the meat has been cooked earlier or has already reached a desired internal temperature, the supply of cooking gas fed to the burner assembly 50 aligned with the rods 26 supporting the cooked meat is reduced so as to warm the meat, without excessive cooking.

Use of a pair of food holding members 26 to support each piece of meat prevents uncontrolled rotation of the meat. During a first portion of a rapid cooking operation, the food holding members 26 locate one surface of the meat facing the grate assembly 36 and the bed of refractory material 48. As the cooking operation proceeds, an appropriate marinade is applied to the meat to prevent excessive drying. Also, the rods 26 are rotated with respect to each other to position an opposite surface of the meat facing the bed 48 of refractory material. In this manner, even, controlled cooking of the meat is obtained.

In accordance with this invention, the rapid cooking unit 10 as disclosed in my abovementioned U.S. Pat. No. 4,402,300 is modified so as to be also capable of use for slow cooking of food, such as meat, over an extended time period, such as 8–12 hours or longer. The invention is based on the premise that by maintaining the internal temperature of the meat at a preselected value, and at the same time maintaining the temperature in the area of the burner assemblies 50 at a preselected value, the meat can be slow-cooked over the extended period with advantageous results. For example, shrinkage of the meat can be kept to within on the order of 10 percent. Further, the meat can be prepared the night before and then slow-cooked during the night unattended for serving the next day, thus eliminating the need to prepare and then rapid-cook the meat on the same day it is to be served.

Figure 2:
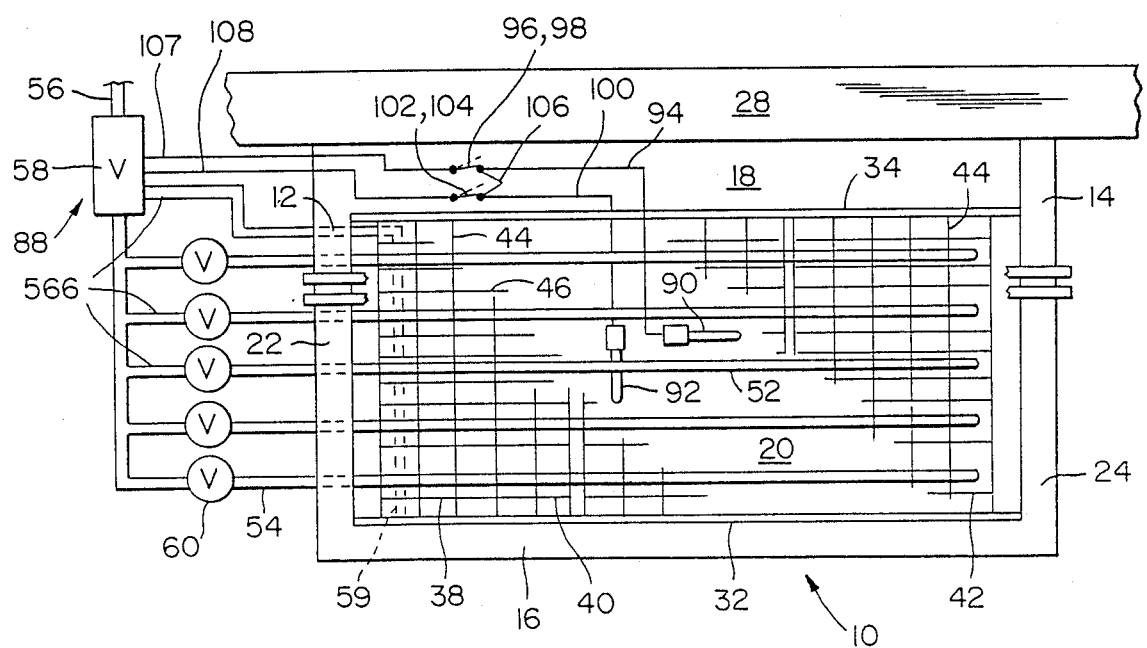
FIG. 2 is a schematic top view of the gas-fired cooking unit of FIG. 1, prior to use.

Referring to FIGS. 1 and 2, in accordance with the invention the cooking unit 10 is provided with a heat control system 88 comprising a first temperature probe 90 for measuring the internal temperature of the meat as represented in FIG. 1 by a centrally located piece thereof on the food holding rods 26. A second temperature probe 92 is provided for measuring the oven temperature of the heating enclosure 20 in an area adjacent the burner assemblies 50.

The first temperature probe 90 forms a part of, and is connected by a signal-transmitting control conductor 94 to an adjustable first electrical thermostat control device 96 having a normally closed contact 98. The second temperature probe 92 forms a part of, and is connected by a signal-transmitting control conductor 100 to an adjustable second electrical thermostat control device 102 having a normally closed contact 104. The normally closed contacts 98 and 104 of the thermostat control devices 96 and 102, which may be mounted in the same enclosure 105 (FIG. 1), are electrically connected in series with one another and respective terminals (not shown) of the main gas valve 58 by electrical conductors 106, 107 and 108, respectively. As is shown in FIG. 2, the gas valve 58 is connected from the gas source 56, via branch lines 56b, to the burner assemblies 50 and the elongated runner-type pilot tube 59.

In a cooking operation, the main gas valve 58 is energized and retained operative through the normally closed contacts 98 and 104 of the electrical thermostat control devices 96 and 102, to cause energization of the burner assemblies 50. Then, as long as both the internal temperature of the food, as measured by the first temperature probe 90, and the oven temperature of the area adjacent the burner assemblies 50, as measured by the second temperature probe 92, remain below their preselected values, the gas valve 58 remains energized to provide gas to the burner assemblies 50. However, if either of the measured temperatures exceeds its preselected value, the contact 98 or 104 of the corresponding thermostat control device 96 or 102 is opened and the gas valve 58 is de-energized to a closed condition. During the cooking operation, heat energy also is conserved and the cooking facilitated by positioning a cover 109, having a heat-insulated top and sides, over the food on the walls 16, 18, 22 and 24, as shown in FIG. 1.

In general, to produce well done meat over a time period of 8-12 hours, the internal temperature of the meat preferably is maintained at a preselected temperature in a range on the order of 170°-180° F. Further, the oven temperature of the area adjacent the burner assemblies 50 is maintained at a preselected temperature in a range on the order of 225°-250° F. For longer or shorter time periods, including rapid cooking or meat which is not well done, these temperatures may be adjusted accordingly.

The temperature probes 90 and 92, thermostat devices 96 and 102 and the gas valve 58 may be of known types. For example, favorable results have been achieved with Model KXP-331-72 electric thermostat "Uni-Kit" control devices of the Robertshaw Company, having associated temperature probes and a selectable temperature in a range of 100°-550° F., and a Model 7000 MVHC combination gas valve of the Robertshaw Company, having a voltage operating range of 250 to 750 millivolts.

Referring now to FIG. 4 of the drawings, another cooking unit which may be used with the present invention is illustrated. The cooking unit, which is generally designated 110, is similar to the previously described cooking unit 10. The main difference between the units 10 and 110 is that the unit 110 utilizes a plurality of separate electric heating coils 112 to heat the bed 48 of refractory material, while the unit 10 uses a cooking gas. The coils 112, which may be individually controllable, or controllable by an electrical switch (not shown) comparable to the gas valve 58 and responsive to the temperature probes 90 and 92, and the thermostat control devices 96 and 102, are positioned beneath a grate assembly 36 that supports a bed of refractory material (not illustrated in FIG. 4). As with the unit 10, surfaces of the side walls forming the heating enclosure 20 support end portions of food holding members or stainless steel rods 26.

The use of the cooking unit 110 is essentially the same as the use of the cooking unit 10. Thus, the method of using the embodiment of FIG. 4 will not be described in detail.

Since the unit 110 utilizes electric heating coils, there is no necessity with this embodiment of the invention to provide flame guard assemblies.

Previously, specific embodiments of the present invention have been described. It should be appreciated, however, that these embodiments have been described for the purposes of illustration only, without any intention of limiting the scope of the present invention. For instance, the individual heating coils 112 of the embodiment illustrated in FIG. 4 can be formed as straight heating elements extending through one of the side walls towards the other, instead of extending in the serpentine fashion illustrated in FIG. 4. It is the intention that the present invention be limited only by the appended claims.

What is claimed is:

1. A method of cooking food, comprising the steps of:
   measuring the internal temperature of the food being cooked;
   measuring the temperature of an area below the food and adjacent a heat source for cooking the food, said heat source being positioned below the food;
   maintaining the heat source energized only when both of the measured temperatures are below respective preselected values; and
   de-energizing the heat source when one of the measured temperatures exceeds its respective preselected value.

2. The method as recited in claim 1 wherein, in order to produce cooked food which is well done over an 8-12 hour period, the preselected value of the internal temperature of the food is in a range on the order of 170°-180° F. and the preselected value of the temperature of the area adjacent the heat source is in a range on the order of 225°-250° F.

3. The method as recited in claim 2, further comprising the step of positioning a heat-insulated cover over the food as it is being cooked.

* * * * *

UNITED STATES PATENT AND TRADEMARK OFFICE
CERTIFICATE OF CORRECTION

PATENT NO. : 4,933,195
DATED : June 12, 1990
INVENTOR(S) : Philip I. Houck

It is certified that error appears in the above-indentified patent and that said Letters Patent is hereby corrected as shown below:

On the title page, [22], delete Filed date "January 3, 1990" and insert -- January 3, 1989 --.

Signed and Sealed this

Eighth Day of March, 1994

Attest:

BRUCE LEHMAN

*Attesting Officer*              *Commissioner of Patents and Trademarks*